United States Patent [19]

Kaufman

[11] 4,115,858

[45] Sep. 19, 1978

[54] MACHINE TOOL CONTROLLER EMPLOYING MICROPROCESSOR SYSTEM FOR CONTROLLING Z AXIS

[75] Inventor: Menachen Kaufman, Hawaiian Gardens, Calif.

[73] Assignee: Houdaille Industries, Inc., Buffalo, N.Y.

[21] Appl. No.: 648,299

[22] Filed: Jan. 12, 1976

[51] Int. Cl.² .............................................. G05B 19/18
[52] U.S. Cl. .................................... 364/474; 318/571; 364/107; 364/118; 364/120
[58] Field of Search ................... 235/151.11; 364/107, 364/118, 120, 474; 318/567, 569, 570, 571

[56] References Cited

U.S. PATENT DOCUMENTS

| | | | |
|---|---|---|---|
| 3,372,321 | 3/1968 | Inaba et al. | 235/151.11 |
| 3,654,613 | 4/1972 | Dunne et al. | 235/151.11 M |
| 3,701,945 | 10/1972 | Gallant et al. | 325/25 |
| 3,746,845 | 7/1973 | Henegar et al. | 235/151.11 |
| 3,909,600 | 9/1975 | Hohn | 235/151.11 M |
| 3,920,972 | 11/1975 | Corwin et al. | 235/151.11 M |

Primary Examiner—Joseph F. Ruggiero
Attorney, Agent, or Firm—Hill, Gross, Simpson, Van Santen, Steadman, Chiara & Simpson

[57] ABSTRACT

A machine tool controller, for automatically controlling the Z axis operations of a machine tool, along a direction parallel with the axis of a tool-holding spindle, includes a system for executing programs in accordance with data which is manually entered into the system for each of a plurality of individual machining operations. The data, representative of two distances, respectively above and below the surface of the work to be machined, feed speed during machining and spindle rotating speed, may be manually entered through the keyboard of a control panel, or the two distances may be entered directly from a position counter which monitors the Z axis position of the spindle, and successful data entry is verified by indicator lights. All of the data for a single machining operation is stored in a memory unit, associated with the microprocessor system, at a single storage location, with each separate item of data stored in a specified memory location of the storage location. The data is accessed, during machining operations, by specifying a storage location for an individual machining operation, and the Z axis movements are automatically controlled in accordance with the data stored at the storage location, and with the type of machining operation being performed. All of the data stored at the several storage locations may selectively be displayed, and means is provided for identifying the data currently being displayed.

24 Claims, 18 Drawing Figures

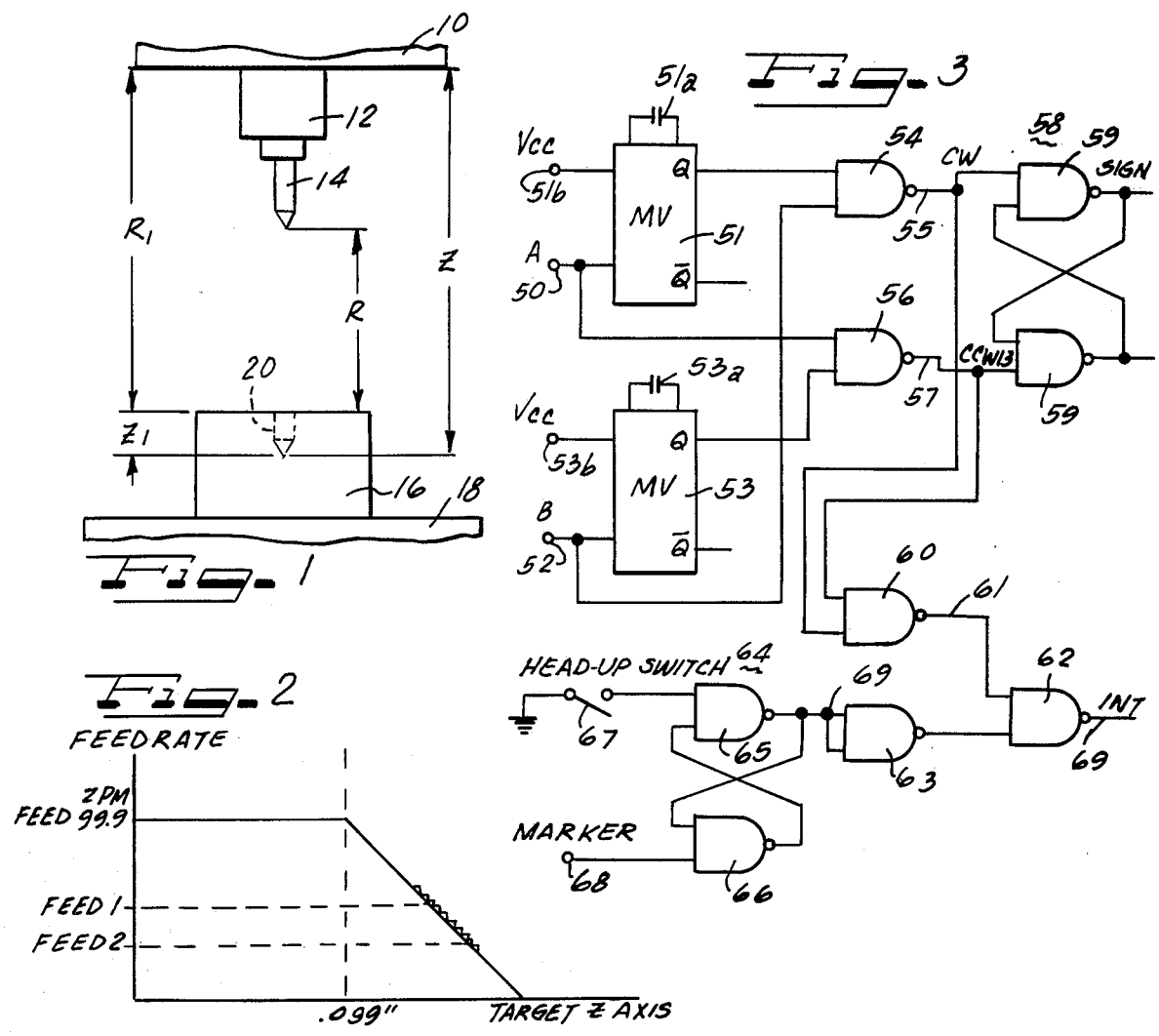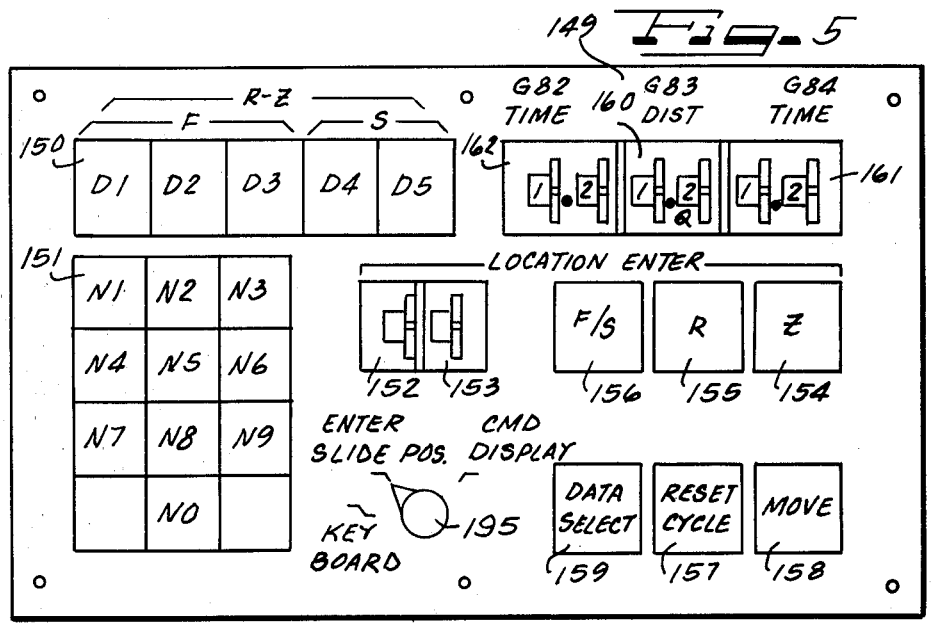

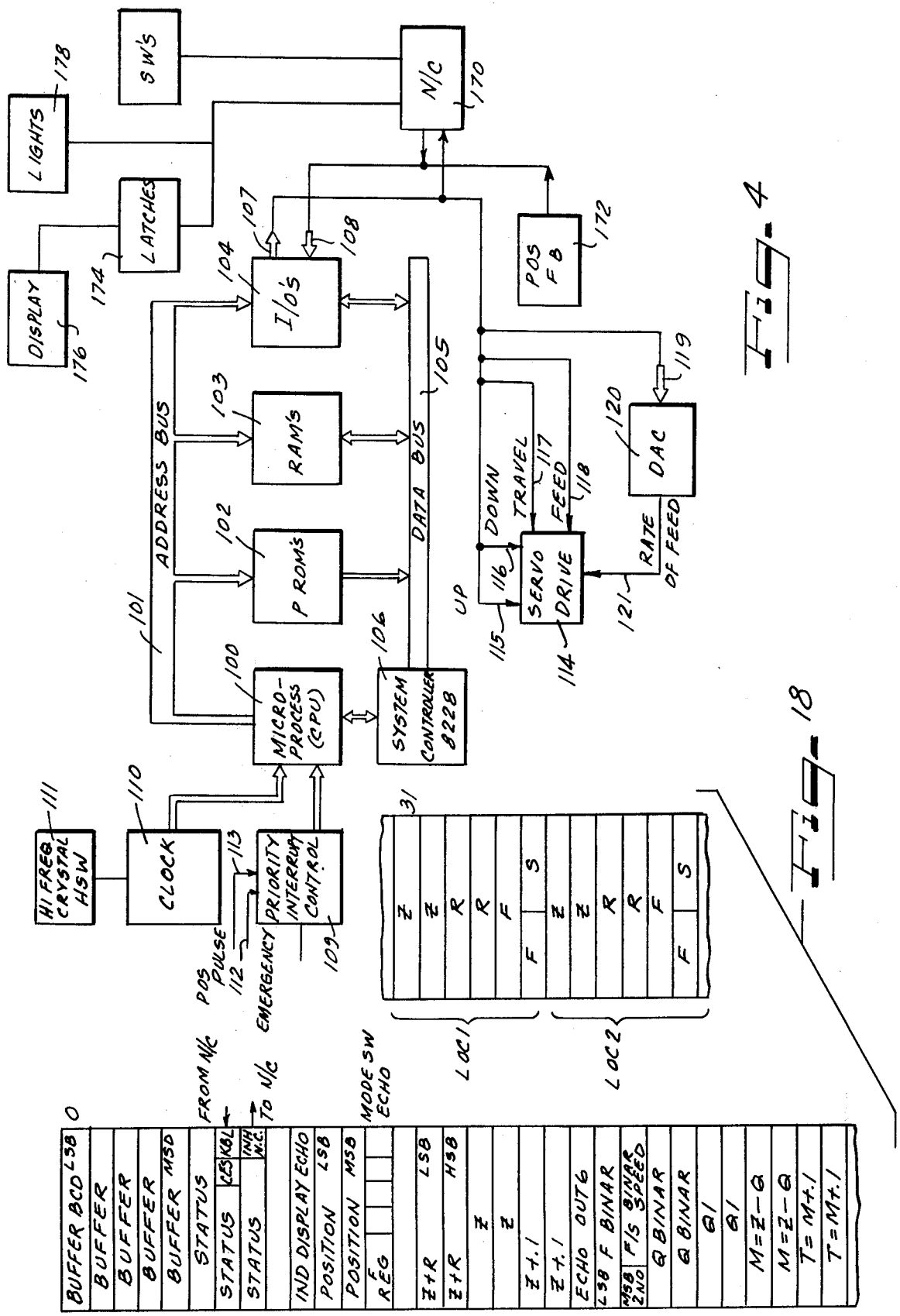

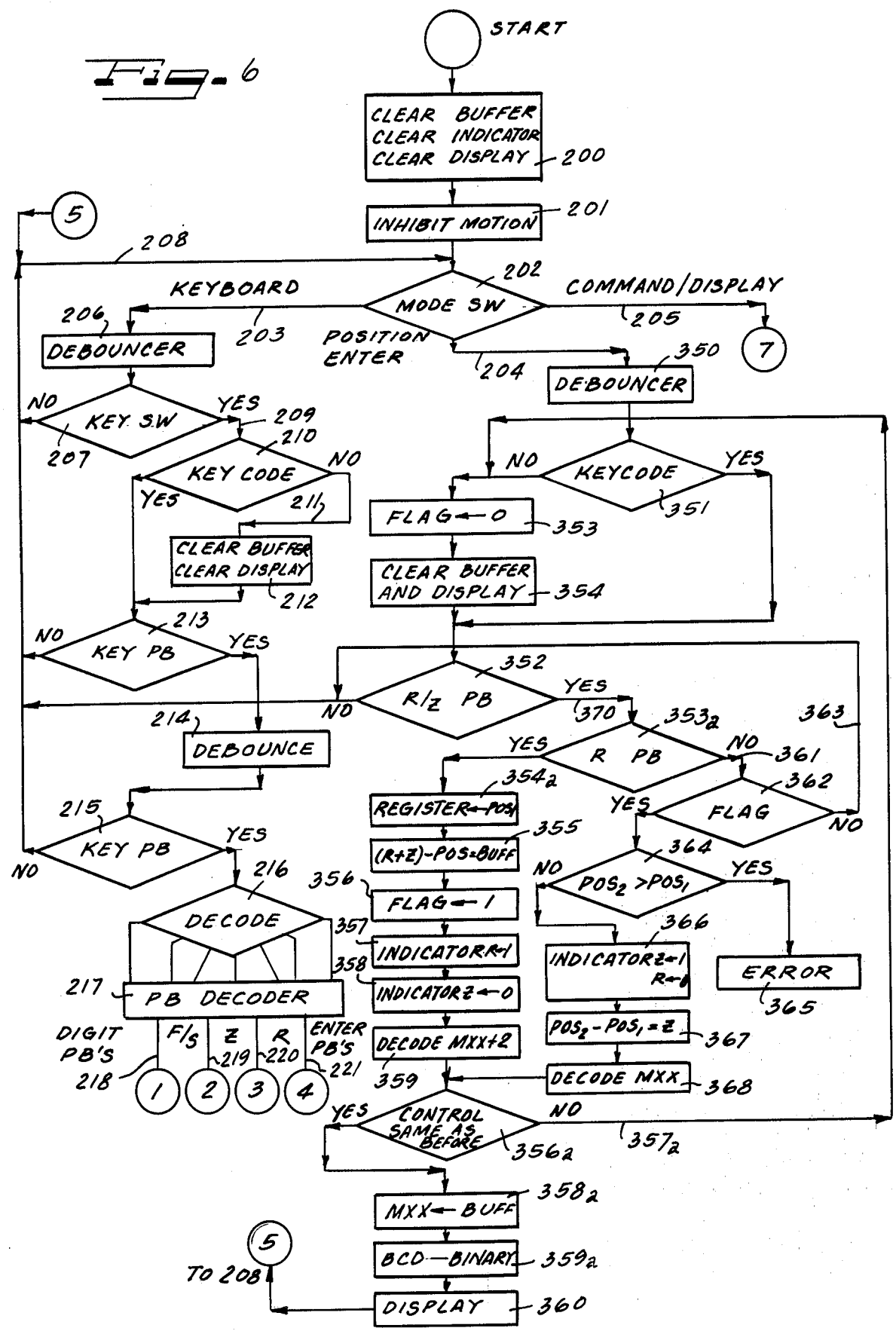

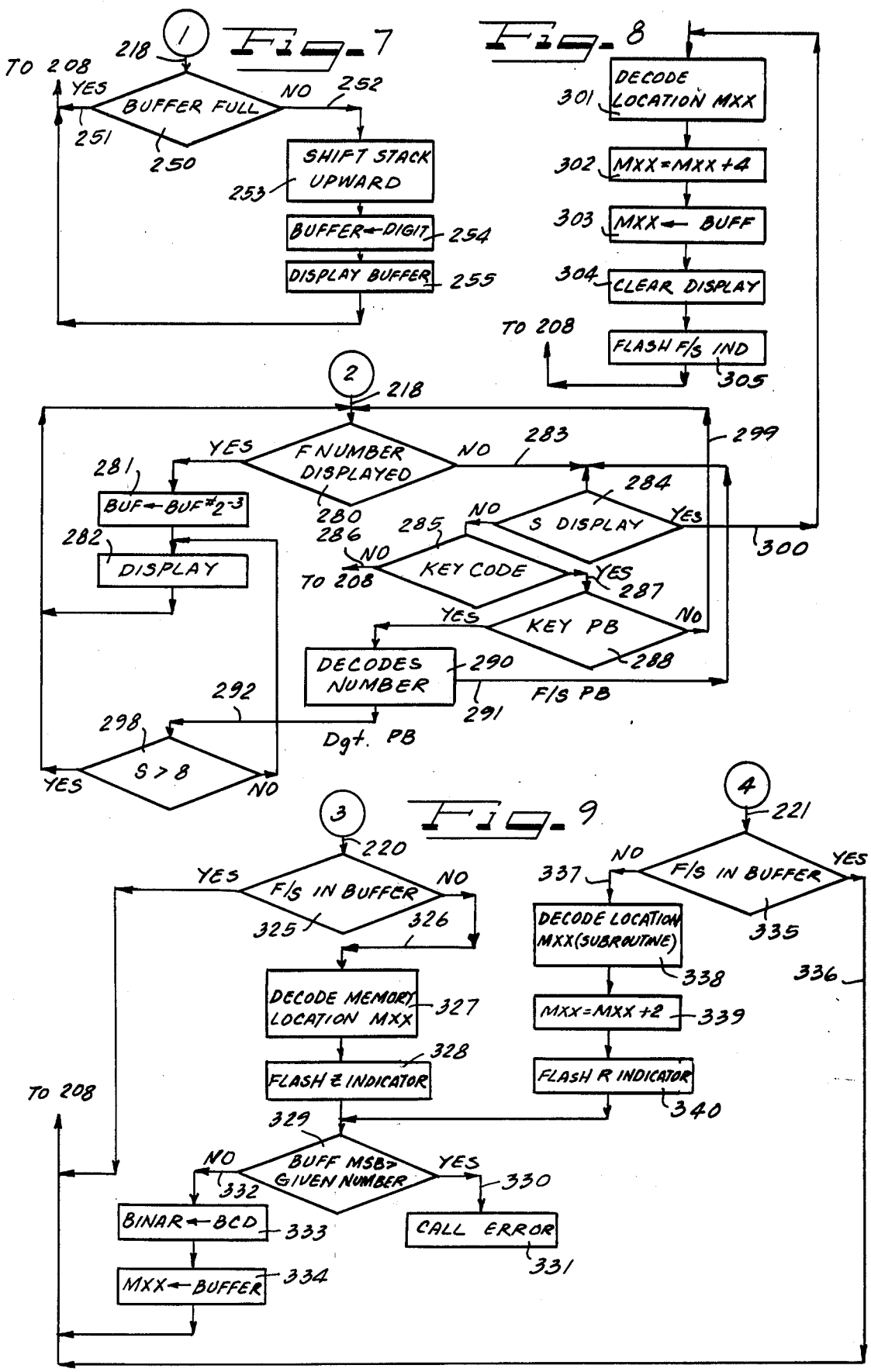

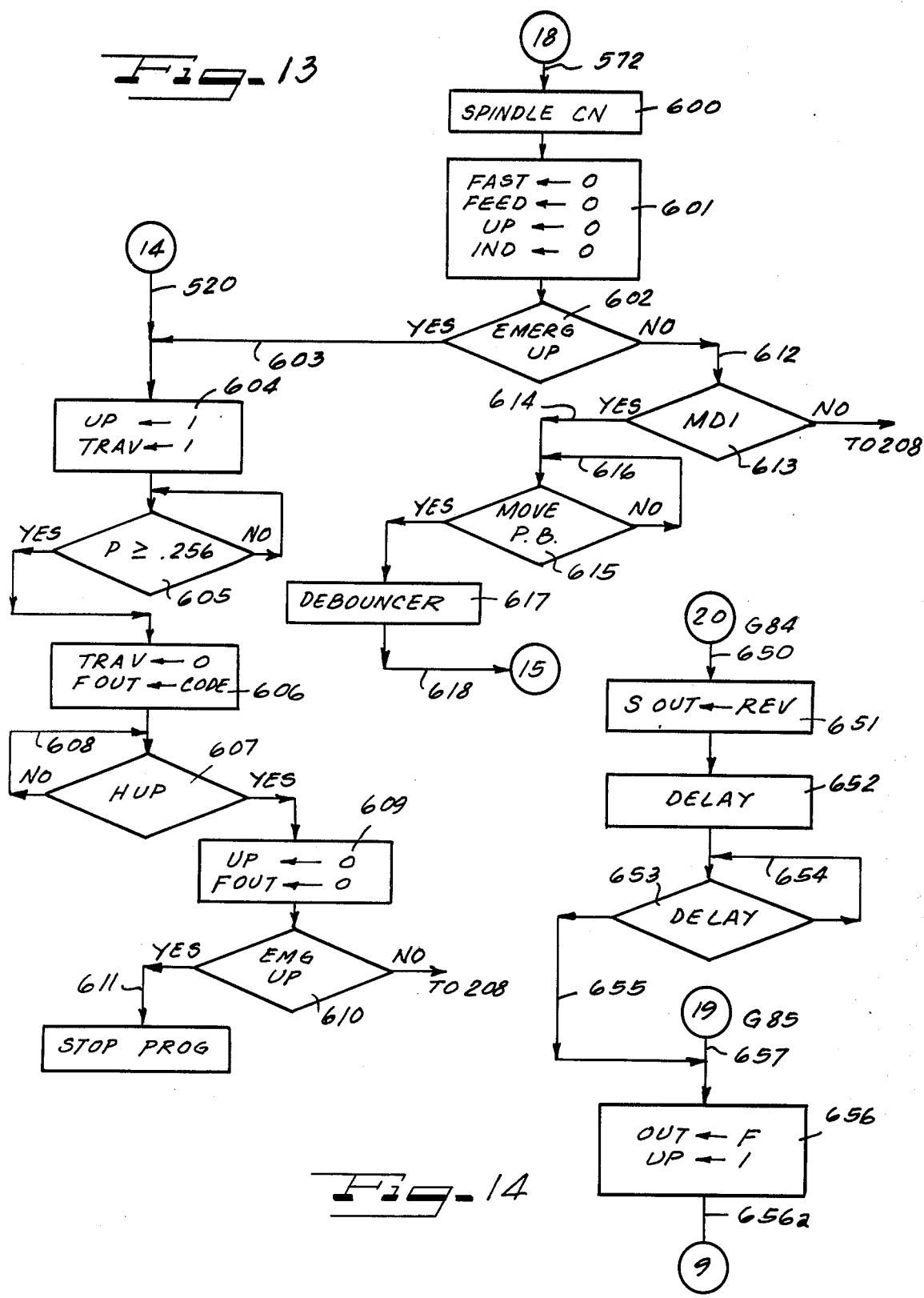

MACHINE TOOL CONTROLLER EMPLOYING MICROPROCESSOR SYSTEM FOR CONTROLLING Z AXIS

BACKGROUND

1. Field of the Invention

The present invention relates to machine tools and more particularly to machine tools which are controlled in their operation in accordance with programs which are automatically executed to perform a variety of machining functions.

2. The Prior Art

Automatic controllers for machine tools are well known and are commonly referred to as numerical controls. Generally speaking such controls are relatively complicated and expensive, and machines which are equipped with sufficient controlling capacity to perform machining operation to close tolerances which are repeatable with very minor variations, are extremely expensive. Part of the reason for such complexity and expense is need to design special purpose apparatus for use in performing the programs of the NC controllers. It is therefore desirable to provide a system and method by which a high degree of accuracy in the performance and repeatability of machining operations can be attained without great expense or complexity.

In one class of machines, known as two axis machines, two axes are controlled by numerical control apparatus, but some information remains to be entered by the operator. In two-axis turret machining centers, the X and Y movements of tool versus work are controlled by numerical control, but the third or Z axis, which controls the depth of movement of the turret, which corresponds to depth of drilling, etc., must be entered by the operator by hand. Typically, mechanical cams and switches are used, to sense the turret or head position and to shift the feed rate from rapid to feed, when the tool approaches the work. Such cam operated switches are cumbersome and bulky, and as a result only a limited number of cam switches can be provided, with a corresponding limitation on the flexibility of the system. It is therefore desirable to provide a system and method by which the mechanical cam switches can be eliminated, and a larger number of different operations can be accommodated.

Although there have been efforts made in the past to produce electronic systems for replacing the mechanical cam switches, they have not been able to attain the optimum degree of flexibility. Accordingly, it is desirable to provide a system and method for providing an electronic system for replacing the mechanical cam operated switches which is unlimited in its flexibility and usefulness.

SUMMARY OF THE INVENTION

It is a principal object of the present invention to provide a controller, for the Z axis of a machine tool, which is capable of controlling the machining activities of such machine tool with great accuracy of positioning and repeatability, without requiring expensive and complicated control systems.

Another object of the present invention is to provide a method and apparatus by which a variety of different operations to be performed by a given machine tool may easily and quickly be entered into the system, and the program currently resident in the system can readily be displayed for operator evaluation and correction.

Another object of the present invention is to provide a system and method whereby data corresponding to operations to be performed by a machine tool are required to be entered in a predetermined sequence, to minimize entry of erroneous data.

A further object of the present invention is to provide a system for the control of a machine tool by which rate and distance information and an identifying characteristic may be entered, by an operator, for individual machining operations to control the position at which the feed changes from traverse to controlled feed, the maximum depth of movement, the feed speed for each operation, and an identification of each such operation.

Another object of the present invention is to provide for the entry of information relating to dwell times and distance parameters for special operations performed by the machine tool.

These and other objects and advantages of the present invention will become manifest by inspection of the following description and the accompanying drawings.

In one embodiment of the present invention there is provided a controller for a machine tool incorporating a microprocessor, a memory associated with the microprocessor, an input/output unit associated with the microprocessor, means for connecting the input/output unit with a machine tool, a control panel connected with the microprocessor for entering data into said memory in accordance with operations to be performed, said operations incorporating a plurality of individual movements of one axis of the machine tool, and means responsive to manual control of the operator for displaying a selected portion of a program from the memory. Means is provided for setting all of the distance data in accordance with the position of the head of the machine tool, it desired, and means is provided for setting or resetting all of the data in accordance with operations of a keyboard.

BRIEF DESCRIPTION OF THE DRAWINGS

Reference will now be made to the accompanying drawings in which:

FIG. 1 is a diagrammatic view of a portion of a machine equipped with the present invention, for illustrating various distances involved in machining operations;

FIG. 2 is a diagram illustrating the velocity of the vertical movement of the tool, relative to the work, as a function of distance between the tool and the work;

FIG. 3 is a functional block diagram of a system for providing a pulse train in response to movement of the machine tool along the Z axis, along with means for determining the sign of the direction of movement;

FIG. 4 is a functional block diagram of a microprocessor system employed in the present invention;

FIG. 5 is a schematic diagram of a control panel employed in an illustrative embodiment of the present invention;

FIGS. 6-17 are diagrams illustrating the sequence of events occurring during operation of the controller, and the associated control apparatus; and FIG. 18 is an illustration of the memory organization within the RAM section of the microprocessor.

Referring to FIG. 1, a machine tool 10 is illustrated with a spindle 12 and a tool 14 mounted in and rotated by the spindle 12. A work piece 16 is supported on a table 18 below the spindle 12, and means (not shown) is provided for lowering the spindle 12, together with the tool 14, toward the work 16. A numerical control device (not shown) is provided for indexing or positioning either the work piece support 18 or the spindle 12, in order to place the tool 14 in a programmed position above the work. The tool 14 is then moved downwardly relative to the work 16, rapidly from a head-up position (as shown) through a distance R, after which slower feed occurs until the tool has been lowered to the correct depth measured by distance Z from a reference plane, machining a hole or recess 20. Alternatively, the tool 14 can be considered to move relative to the work 16 through a distance $R_1$ from the head-up reference plane, after which feeding occurs or a distance equal to $Z_1$. The head-up reference plane represents the highest elevation which the working end of the tool 14 can assume.

Figure 10:
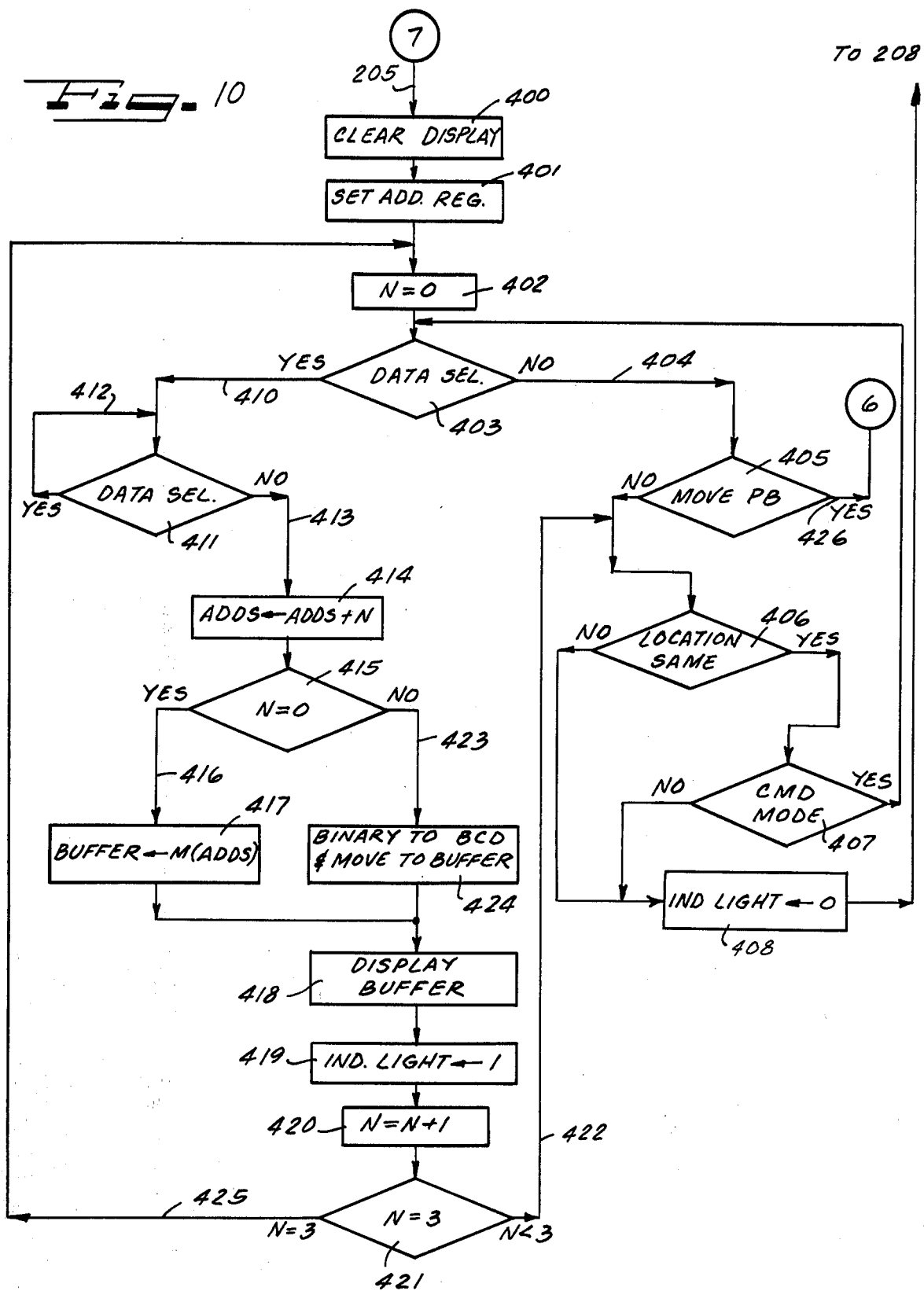

In the present invention a closed loop position servo system is preferably employed to control the Z axis drive of the machine tool, using a photoelectric decoder as a feedback device. The encoder produces an electrical signal in accordance with the position of the tool. The distance data, the feeed speed data, and the operation identification are entered into the memory of the microprocessor unit either through a keyboard, or by moving the Z axis drive of the machine to the desired position, and entering the appropriate distance data into the memory, without defining or measuring any specific distances. A controller constructed in accordance with the present invention stores data for fifty independent operations, which can be entered and read out at will from the memory, in accordance with the operation of certain controls by the operator.

In the apparatus of the present invention, a control panel incorporating a keyboard is provided (FIG. 4) in which the operator manually enters the distances to be traveled by the head as well as the feed speed and operation-identifying data.

In the following description, certain G codes will be referred to, by which are meant the standard codes as adapted by the EIA. They are: G 80: cancel cycle, G 81: drilling cycle, G 82: facing cycle (selective dwell), G 83: deep hole drilling (reciprocating feed), G 84: tapping cycle, G 85: boring cycle, G 86: milling cycle, and G 88: lead screw tapping cycle.

The present invention incorporates a microprocessor for executing the control functions of the system. The use of the microprocessor makes it possible for the entire system to be economically constructed and manufactured, and greatly facilitates maintenance and repair procedures. A minimum of components is required, which not only minimizes space and power requirements, but also enhances reliability.

The required cycle time of the microprocessor which is employed is limited by the rate of data which must be processed for a given system. This data rate is proportional to the product of the required resolution and the maximum feed speed. For a system in which the Z axis may travel at a rate of up to 300 inches per minute, with a position resolution of 0.0005 inches, the cycle time of the microprocessor must be equal to or less than 100 microseconds, in order to allow the performance of the necessary calculations between successive position indicating pulses transmitted by the position feedback unit. In order to allow a safety factor for unexpected events such as a short duration power failure or the like, it is preferable to employ a microprocessor system having a cycle time of on the order of half of that.

When the system of the present invention is used with a machine which has a maximum distance of travel of about fifteen inches, with a resolution of 0.0005 inches, the total number of pulses produced by the position feedback unit for fifteen inch travel is 30,000, which can be expressed, in binary, by a fifteen bit number. An eight bit microprocessor can process information relating to the distance of travel with two bytes, each eight bits in length. A sixteen bit microprocessor could be used as well, but the larger memory capacity of a sixteen bit microprocessor is not required for machine tool applications, and an eight bit microprocessor is accordingly preferred.

The system of the present invention preferably incorporates means for supplying digital position signals, so that the current position of the tool can be monitored by counting the pulses, for movement in one direction, and subtracting pulses for movement in the other direction.

The digital feedback unit preferably comprises a dual channel optical encoder, in which two channels of optically recognizable marks are coded on a disc which is driven by a shaft coupled to the drive mechanism for the spindle supporting head. The marks in the two channels are 90° out of phase, so that observation, by photoelectric means, of the sequence of arrival of the marks and spaces in the two channels furnishes a means for distinguishing the direction of the shaft rotation.

Apparatus for producing an output pulse train having a pulse repetition rate proportional to the shaft rotation velocity, with a signal indicative of the sign of the rotation, is illustrated in FIG. 3. The two optically-readable channels may be referred to as the A channel and the B channel, which produce square waves, 90° out of phase with each other. The optical sensing means (not shown) for each channel is connected to an input terminal of a monostable multivibrator, which is switched from its stable to its quasi-stable state by each pulse arriving at its input. An input 50 terminal, connected to the A channel, is connected to the set input of a flip-flop 51 while the input 52 from the B channel is connected to the input of a multivibrator 51, the period of which is controlled by a capacitor 51a. It is connected to a source of voltage at a terminal 51b. An identical multivibrator 53 is provided for the B channel.

A NAND gate 54 is connected to the Q output of the multivibrator 51, and to the B channel input terminal 52. Accordingly it produces low level signals on its output 55 only when an A pulse arrives at the terminal 50 during the period that the B input line is high. A NAND gate 56 has one input connected to the Q output of the multivibrator 53 and its other input connected to the A channel input terminal 50, so that it produces low signals on an output line 57 when a B pulse arrives during the period that the A input line is high. One or the other of the gates 54 and 56 thus produces pulses, on either the line 55 or the line 57, in accordance with clockwise or counterclockwise direction of the encoding shaft, corresponding to upward or downward tool movement. The lines 55 and 57 are connected to two inputs of an RS flip-flop 58, incorporating NAND gates 59, so that the state of the flip-flop 58 is indicative of the sign of rotation, namely, clockwise or counterclockwise. Both the lines 55 and 57 are connected to two inputs of a NAND gate 60, so that positive-going pulses are produced on the line 61 by each pulse on either the line 55 or 57. The line 61 is connected to one input of a NAND gate 62. An RS flip-flop 64, incorporating NAND gates 65 and 66, has one input connected to a head-up switch 67 and the other input connected to a terminal 68 which receives marker pulses, occurring once for each revolution of the position-indicating shaft. The flip-flop 64 normally enables the gate 62 to pass pulses from line 61 to an output line 69. The gate 62 is inhibited when the flip-flop is set by closure of the head-up switch, but is reset by the first marker pulse occurring after the head-up switch is opened.

Referring now to FIG. 4 the general organization of the microprocessor system employed in the present invention is illustrated. The microprocessor central processing unit or CPU 100 is connected by means of an address bus 101 with one or more programmable read-only memories or PROM'S 102, one or more random access memories or RAM'S 103 and an input/output controller 104. Each of the units 102-104 is connected with a data bus 105, and a system controller 106 is connected with the CPU 100 and with the data bus 105. The input/output control 104 is associated with a plurality of output channels 107 and with a plurality of input channels 108. The input channels receive data generated externally, as from an NC unit 170, and the position feedback unit 172 of the machine tool being controlled. The output channels are connected with a servo drive unit 114, both directly and through a digital-to-analog converter 120, and to a series of latches 174 which control operation of the numerical display unit 176 and various indicator lights 178.

The microprocessor 100 is also connected with an interrupt unit 109, and functions in successive cycles under control of a clock 110 which is driven by a crystal oscillator 111. The interrupt control unit has two input lines 112 and 113 which causes it to function to interrupt the program then being performed by the CPU 100. The line 112 is connected to an emergency-up switch (not shown) by which operation of the apparatus can be halted on an emergency basis. The line 113 is energized by pulses occurring on the line 69, and the program then in progress is interrupted to allow updating of the position information.

The servo drive unit 114 is responsive to signals on five of the outputs 107, four of which are the "up" output line 115, a "down" output line 116, a "traverse" output line 117, and a "feed" output line 118. Signals may occur one at a time on the "up" and "down" outputs and on the "traverse" and "feed" outputs, to control the direction and speed of the drive. When the "feed" output is energized, the actual speed of operation of the servo is controlled in accordance with signals on a plurality of output lines 119, making up the "speed" output. The lines 119 are connected to inputs of a digital-to-analog converter 120, to provide an analog signal on a single output line 121, for controlling the speed of the servo system.

Certain of the outputs 107 and inputs 108 are connected with a control panel 149, which is provided for entry and display of data. The feed voltage on the line 121, which is illustrated in FIG. 2, remains constant during an operation cycle, but when the tool reaches a position which is 0.099 inches from the desired position, the analog signal supplied to the servo unit decreases, and becomes generally proportional to the distance from the desired position, decreasing to zero as the desired position is reached. Because the analog signal is derived from a digital signal produced by the CPU of FIG. 4, it typically takes the form of a staircase signal as illustrated in FIG. 4, rather than a linearly descending signal. A filter can be used, if desired, to eliminate the steps in this analog signal.

A plan view of the control panel 149 is shown in FIG. 5. It includes a display device 150 capable of displaying five digits indicated in FIG. 5 as D1 through D5. The display is preferably driven by a multiplexed output from the microprocessor in the manner familiar to those skilled in the art. In order to conserve the activity of the CPU, the display is not energized continuously, but only when required in connection with entry and display of data, when the CPU is mostly idle. As data is entered into the system through the keyboard 159, it is displayed on the display unit 150.

Fifty storage locations are provided for the entry of distance speed and identifying information, corresponding to the $R_1$ and $Z_1$ distances, (FIG. 1), the feed speed F, the spindle speed S. A pair of thumb operated wheels 152 and 153 are provided for specifying the storage location at which data is to be entered. Three push buttons 154-156 are provided for entering into the memory, the data displayed in the display unit 150 as the Z distance, the R distance, the feed speed or number F, and the spindle speed S, in accordance with which of the three push buttons 154-156 is pressed at any given time. In this manner data corresponding to the parameters for each of the fifty different storage locations may be entered. In addition, the data previously entered at any storage location defined by the thumb wheels 152 and 153 can be changed simply by repeating the operation which was performed during entry.

A three position mode switch 195 is provided. The three positions correspond to keyboard, position-enter, and command/display. When the switch 195 is in its keyboard position, data may be entered by means of the keyboard 195 and the switches 154-156 as described above. When the switch 155 is in its position-enter position, the current position of the tool is examined and the R and Z distances are calculated, when the push buttons 154 and 155 are pressed. This data is stored at the location defined by the positions of the thumb wheels 152 and 153. This permits coding or programming the system in accordance with a specific position of the tool, rather than by entering numerical representations of distances via the keyboard 151. When the switch 195 is in its command/display position, the contents of a given storage position are displayed in the display unit 150, so that the contents of the fifty storage locations can be verified or examined whenever the operator so desires. In addition, the operation defined by the parameters stored at the storage location defined by the thumb wheel switches 152 and 153 may be performed, by depressing a move push button 158.

Three push buttons 157-159 are provided for controlling operation of the system. When the data select push button 159 is depressed, and the switch 195 is in its command/display position, the data to be displayed is selected. Repeated depressing of the push button 159 changes the data which is displayed, so that the F/S data, the R data, and the Z data are displayed in turn. When the push button 157 is depressed, the address register of the microprocessor is reset prior to execution of a program, and depression of the move switch 158 causes an operation to be executed, such operation being defined by the parameters stored at the storage location defined by the switches 152 and 153. Three additional pairs of thumb wheel switches 160-162 are also provided, to enter data used in special operations, as described hereinafter.

The various programs which are executed by the system are illustrated in flow chart form in FIGS. 7-17. Three main programs are provided, with several subroutines. The main programs are defined by the position of the mode switch 195. The state of the switch 195 is examined periodically throughout the execution of the microprocessor. If the switch is found to be in the same state as it was when last examined, the program proceeds. If the state of the switch is found to be different than when last examined, the buffer and the display are both cleared and the program branches to that called for by the new position of the switch 195.

Several sub-routines are employed during execution of the various parts of the program for debouncing the operation of the push buttons of the control panel 149, converting between binary-BCD data forms, displaying data in the display unit 150, etc. They are executed, when needed, during the regular course of the program.

FIGS. 6-17, illustrate the program of the microprocessor employed in a preferred embodiment of the present invention, with each of the blocks or boxes shown therein being descriptive not only of a program step performed by the microprocessor, but also of the structure which is required to perform that step. Such hardware comprises electronic and mechanical structure which is known to those skilled in the art and therefore need not be described in detail herein. Much of the hardware is embodied in the microprocessor, as will be appreciated by those skilled in the art. The various blocks or boxes of FIGS. 6-17 will be referred to as units.

Referring now to FIG. 6, when the program is first entered a unit 200 is effective to clear the input buffer and to clear the display unit 150, and a unit 201 inhibits operation of the N/C unit 170 (FIG. 4) by sending an inhibiting signal to the N/C unit via the output line 107.

The input buffer is a section of the RAM unit 103 (FIG. 4), and specifically comprises the first five address locations of the RAM, as shown in FIG. 18. It is used to store, temporarily, data entered into the keyboard 151 (FIG. 5) before it is stored as operation data in one of the fifty storage locations.

Then control is passed to a unit 202 which examines the state of the mode switch 195. If it is in its keyboard position, a branch 203 is selected, and a branch 204 is selected if it is in its position-enter position. If it is in its command/display position, the branch 205 is selected.

When the branch 203 is selected a unit 206 performs a debouncing sub-routine operation, so that a single depression of one of the push buttons of the keyboard is read as a single depression. Thus, multiple signals resulting from bouncing of the switch contacts are ignored. Then control is passed to a unit 207 which examines whether one of the switches of the keyboard 151 has been operated. If not, control is returned via a branch or line 208 to the unit 202 and the operation described above is repeated. When a key switch is operated, a branch 209 is selected, and control passes to a unit 210 which recognizes a key code, resulting from operation of a key switch.

If a key code is not recognized, a branch 211 is selected and the buffer and display is cleared by a unit 212, to avoid entry of erroneous data, which may result from operating two keys simultaneously. Then control passes to a unit 213. If a key code is sensed by the unit 210, the control is passed to the unit 213 directly without clearing the display and the buffer. The unit 213 examines whether a key push button remains depressed, and if not, control is returned to the unit 202 over the line 208. Otherwise a debounce unit 214 effects a debounce operation after which unit 215 again examines the keyboard to see whether a key remains depressed. If not, control returns to the unit 202 over the line 208. If the key remains depressed, however, control passes to unit 216 which decodes the key which is being depressed. The unit 216 operates in conjunction with a keyboard decoder unit 217, which passes control to one of a number of branches 218-221, depending on the identification of the key which has been operated. If one of the numerical keys of a keyboard 151 is depressed, the branch 218 is selected. If the F/S push button 156 is operated, the branch 219 is selected. If the R push button 155 is operated, the branch 220 is selected and if the Z push button 154 is operated, the branch 221 is selected.

The branch 218 passes control to a unit 250 (FIG. 7) which examines the state of the buffer associated with the keyboard 151, an indication of which resides in one of the hardware registers of the CPU 100. If the buffer is found to be full, control passes to a branch 251 which is connected with the line 208 to return control to the unit 202. Since the buffer has capacity for only five BCD digits, it is full if five digits have been entered from the keyboard since the buffer was last cleared. If the buffer is not full, a branch 252 is selected and a unit 253 shifts the buffer address pointer by one place, after which the unit 254 decodes the digit code of the operated key switch BCD format, and enters the BCD representation into the display buffer where it can be displayed in the display unit 150. Then unit 255 executes a display routine, by which a plurality of latches are set in accordance with the data in the buffer, and the content of the latches is displayed continuously. Then control is returned via line 208 to the unit 202.

Numerical data which is entered into the system from the keyboard 151 is entered into a five position buffer constructed as a last-in first-out, five position, stack. The buffer is associated with the latches of the display unit 150 in such a way that the first stack location is displayed in the right hand digit (D5) of the display unit 150, the second is displayed in D4, etc. Accordingly, the display of data entered into the system by the keyboard is shifted from right to left on the display unit 150, one digit at a time, in the same manner as conventionally used in hand-held electronic calculators. Five digits are successively entered and displayed by the use of the program described above. Any attempt to enter six digits fails because of the operation of the unit 250. A following operation involves depression of one of the push buttons 154-156, to enter the currently displayed data into memory, at the location identified by the thumb wheels 152 and 153.

When the branch 218 is selected by the unit 217 control passes to a unit 280 (FIG. 8) which inspects the buffer to determine whether a number last entered by the keyboard (two or three digits in length) is a feed (or F) number. If it is, control is passed to a unit 281 which operates to shift the buffer so that the F number data is displayed in the first three positions D1-D3 of the buffer, leaving positions D4 and D5 blank, which are reserved for displaying the feed speed code.

The unit 281 passes control to the unit 282 which causes the F number to be displayed in the proper position, after which control is returned to the unit 280.

When the unit 280, upon inspection of the buffer, finds that the last data entered through the keyboard is not an F number, a branch 283 is selected, and control is passed to a unit 284 which determines whether the last-entered data is a spindle speed number S. If not, control passes to a unit 285 which determines whether a key code is recognized. If not, a branch 286 is selected which returns control to unit 202 over line 208. Otherwise a branch 287 is selected which gives control to a unit 288 which inspects the keyboard 151 to determine whether a key has been depressed, and if not, returns control to unit 280. If a key switch is operated, control branches to a unit 290 which decodes the number represented by the depressed key, if a number key. If the depressed key is the F/S key 156, a branch 291 is selected and control is returned to the unit 284. When a number key is decoded by the unit 290, a branch 292 is selected and control passes to a unit 293 which determines whether the decoded number is greater then eight. If not, control is passed to the unit 282 which displays the number and then control returns to the unit 280. If the S number is greater than eight, it is not displayed, and control is returned directly to the unit 280. This is because the maximum number indicative of a speed code S is eight.

When the unit 284 finds that an S code is displayed, branch 300 is selected and control passes to unit 301 which decodes the memory location by inspecting the thumb wheel switches 152 and 153, after which unit 302 adds four to the base number corresponding to the position of the thumb wheel switches, to arrive at the F/S address, and unit 303 converts the BCD number stored in the buffer to binary and stores it in the memory location identified by the calculated address. The control is passed to unit 304 which clears the latches of the display device and passes control to unit 305 which momentarily (for approximately ½ second) flashes the F/S push button 156 to indicate the successful entry of F/S information. Then control passes over the line 208 to return to the unit 202.

The operation of the program illustrated in FIG. 8 provides for the entry of a two or three digit F number, by the keyboard 151, which is initially displayed in positions D3–D5 of the display unit 150. Then, when the F/S push button 156 is depressed a first time, this information is shifted leftwardly until it occupies the D1–D3 positions of the display unit. Then a single digit S number from zero to eight is entered by means of the keyboard 151, and the S number is displayed in the display unit D5, after which a second depression of the F/S switch 156 causes both the F and the S numbers to be stored at the appropriate location in memory, as defined by the thumb wheel switches 152 and 153.

When the unit 217 selects the branch 220, in response to detection of the operation of the Z push button 154, control is passed to a unit 325 (FIG. 9) which examines the buffer to determine whether it is in the F/S format, which is signified by the F/S push button 156 having been depressed one time. If so, the operation of the Z push button 154 is erroneous, and control is returned to the unit 202 over the line 208, so that the F/S entry can be completed. If there is no incomplete F/S operation, a branch 326 is selected passing control to a unit 327 which decodes the memory location identified by the thumb wheel switches 152 and 153, and passes control to a unit 328 which momentarily flashes (for approximately ½ second) the Z push button 154 to indicate successful completion of the Z entry operation. Then control passes to the unit 329 which compares the most significant digit of the Z number stored in the buffer a number permanently stored in memory, to insure that Z numbers which are too large for the capacity of the machine tool are not entered. If the comparison fails, as a result of an excessive Z number, a branch 330 is selected and an error routine 331 is entered. If not, a branch 332 is selected, passing control to a unit 333 which converts the data in the buffer into binary code, and then control passes to the unit 334 which stores it in the memory location identified by the thumb wheel switches 152 and 153. Then control returns to the unit 202 over a line 208.

When the R push button 155 is depressed, branch 221 is selected, and control is passed to a unit 335 (FIG. 9) which determines whether the buffer is in its F/S condition. If it is, the branch 336 is selected and control is returned to the unit 202 over the line 208. If not, a branch 337 is selected, with the address identified by the thumb wheel switches 152 and 153 decoded by a unit 338, after which the address is increased by two, by operation of unit 339, and control passes to a unit 340 which flashes the R push button 155 (for approximately ½ second) to indicate successful completion of the R entry information. Then control passes to the unit 329 with the operation as described above which compares the most significant digit of the number stored in the buffer with a maximum number maintained in storage, converts it to BCD format and then stores it at the calculated memory location.

By means of the program described above, it is possible to enter data corresponding to the F/S, R and Z parameters into memory location identified by the thumb wheel switches 152 and 153. Although these switches directly indicate one of fifty storage locations, the programs described above effect a decoding of the thumb wheel switches into the proper addresses for the several parameters. Thus, the Z data is stored at the address decoded directly from the thumb wheel switches, the R data is entered into the memory location identified by an address higher by two than the Z address, and the F and S data are entered into a memory location identified by an address higher by four. Two bytes of storage are required for each of the above, because each of them may be represented by a binary number having as many as fifteen bits.

When the mode switch 195 is found to be in its position-enter condition, the R and Z data is entered into the memory locations defined by the thumb wheel switches 152 and 153, but it is not necessary to enter the data into the keyboard 151. Instead, a representation of the current position of the movable member of the machine is used to calculate the R and Z data, which is entered into the appropriate storage locations.

When the branch 204 is selected by the unit 202 (FIG. 6), control is passed to a unit 350 which performs a debounce routine and then passes control to a unit 351 which determines whether a key code is recognized. If a key code is recognized, control is passed directly to a unit 352, and, if not, control passes to the unit 352 through two other units 353 and 354 which, respectively, reset a flag, indicative of an R entry, and clears the buffer and display. Only the R and Z data may be entered into the system during the position-enter program and so the unit 352 determines whether either the R or Z push buttons have been depressed, and, if not, control passes over the line 208 to return to the unit 202.

If the unit 352 finds that either the R or Z push button has been depressed, branch 370 is selected and control passes to a unit 353 which determines whether the R push button is the one which is depressed. If the R push button has been depressed, control passes to a unit 354 which transfers a representation of the current position to a register and then control is passed to a unit 355 which calculates the correct R data by subtracting the position representation from a quantity permanently stored in memory which represents the total travel (R + Z) of the tool. The difference is entered into the buffer. Then a unit 356 sets the R-entered flag, and the units 357 and 358 set the R and Z indicators to one and zero, respectively, so as to indicate an R-entry operation. Then the unit 359 decodes the address location for the R data, by inspecting the thumb wheel switches 152 and 153, and passes control to a unit 356. The unit 356 examines the state of the switches 152 and 153 to determine that they have not changed since the data resident in the buffer was placed there. If they have changed, a branch 357 is selected and control is returned to unit 353, to repeat the operation described above. Otherwise, control passes to the unit 358 which decodes the address of the memory location defined by the switches 152 and 153, and enters the contents of the buffer to that location. Then the unit 359 converts the data from BCD to binary, the unit 360 functions to display the data and then control is returned to the unit 202 over the line 208.

By the processes described above, the R data is entered into the appropriate location in the memory.

Subsequently, the tool is moved downward further to the Z position and the Z push button 154 is then depressed, in order to enter the Z data into the memory. This causes the program to execute the same steps as described above down to the unit 353 which chooses branch 361 as the result of determining that the Z push button, instead of the R push button, has been depressed. Control then passes to unit 362 which examines the R indicator, which was set when the R data was entered by the unit 357. If this indicator is found not set, it means that an R entry operation has not been completed, and branch 363 is selected, returning control to the unit 202. By this means, R data must be entered prior to Z data, to minimize the chance of erroneous data entry. If R data has already been entered, control passes to the unit 364 which compares the current position with the position at the time the R data was entered. If the current position is greater, indicating that the head has been moved up since the R data was entered, an error condition is recognized and control passes to an error routine 365. Otherwise control passes to a unit 366 which sets the Z indicator to one and resets the R indicator, and then unit 367 calculates the difference between the R and Z positions, resulting in the Z data. Then the unit 368 decodes the Z address in accordance with the setting of the thumb wheel switches 152 and 153, and passes control to the unit 356, which determines that the address location thumb wheel switches have not been modified since entry of the R data. Then the Z data is entered from the buffer to the calculated memory location, by a unit 358, converted to BCD by unit 359, and displayed by operation of the unit 360, after which control returns to unit 202.

When the mode switch 195 is in its command/display position, branch 205 is selected and the program illustrated in FIG. 10 is entered. This program has two major portions, a first of which operates to retrieve and display data which has previously been stored in the memory, with the second controlling actual movements of the tool in accordance with the recorded data. The data retrieval and display portion is illustrted in FIG. 10.

The branch 205 passes control to a unit 400 which clears the display and passes control to a unit 401, which sets the address register of the RAM unit 103 to the location defined by the thumb wheel switches 152 and 153, and passes control to a unit 402. The unit 402 sets an N register equal to zero. The N register is a hardware register included within the CPU 100. Then control is passed to a unit 403, which examines the condition of the data select push button 156. If it has not been depressed, a branch 404 is selected and control is passed to a unit 405 which examines the state of the move push button 158. If it has also not been depressed, control passes to unit 406 which determines whether the address location defined by the switches 152 and 153 has been changed. If not, a unit 407 determines whether the switch 155 is still in the command mode and if so, returns control to the unit 403. If the unit is not still in the command mode, or if the memory location is not the same when inspected by the unit 406, control is passed to unit 408 which resets all indicator lights on the control panel, and returns control to the unit 400, after which the operation described above is repeated.

When the data select switch 156 is found to be depressed by the unit 403, a branch 410 is selected, passing control to a unit 411 which again inspects the data select switch and retains control, by a branch 412, until the push button has been released. Then a branch 413 is effective and passes control to the unit 414, which increases the setting of the address register (for the RAM unit 103) by the content of the N register, which is initially zero because it was reset by operation of unit 402. Then control is passed to a unit 415, which inspects the state of the N register. If it is found equal to zero, a branch 416 is entered and control passes to the unit 417 which loads, into the buffer (in BCD form) the F/S data stored at the address location specified by the address register. Then the unit 418 causes the contents of the buffer to be displayed and the unit 119 turns on the indicator light associated with operated push button, viz., the push button 156, to indicate the F/S data is being displayed. Then a unit 420 increments the contents of the N register, and passes control to a unit 421. The unit 421 compares the content of the N register with the quantity three. If the N register contains less than three, a branch 422 is selected, returning control to the unit 406 which determines whether the switches 152 and 153 have been changed. Then, if the command/display mode remains selected, the unit 407 returns control to the unit 403. As long as the data-select switch 156 is not energized, the unit 403 returns control to the unit 405 which, if the move push button 158 has not been depressed, returns control to the unit 406. The sequence described in repeated until the data-select push button 156 is again depressed. Then the unit 411 receives control and retains it until the push button is released, after which unit 414 adds the content of the N register to the address register, incrementing it from the F/S storage location to the R storage location, and passes control to the unit 415. Since the N register is no longer equal to zero, the branch 423 is selected, passing control to a unit 424 which converts the data stored at the memory location identified by the address register to BCD form and moves it into the buffer. Then control is passed to the unit 418 for displaying the buffer contents. The unit 409 causes the indicator light associated with the R push button to be illuminated, in accordance with the content of the N register, and then the unit 420 again increments the N register, so that Z data is displayed after the data-select switch is next depressed. When the N register has been incremented to three, the unit 421 selects the branch 425, returning control to the unit 402, which resets the N register to zero, so that F/S data is displayed when the data-select push button is next operated.

By the program described above, successive depressions of the data select switch 156 causes the display unit to first display the F/S data, then the R data, then the Z data, each time illuminating the appropriate push button. When the data select switch is pressed again, the F/S data is again displayed in the display unit 150. By this means, any desired data can be selected for display.

The program described above is repeated until the mode switch 195 is changed in its position, after which the unit 407 returns control, via the line 408, to the unit 202 over the line 208. The unit 408 extinguishes all indicator lights in the process.

Figure 11:
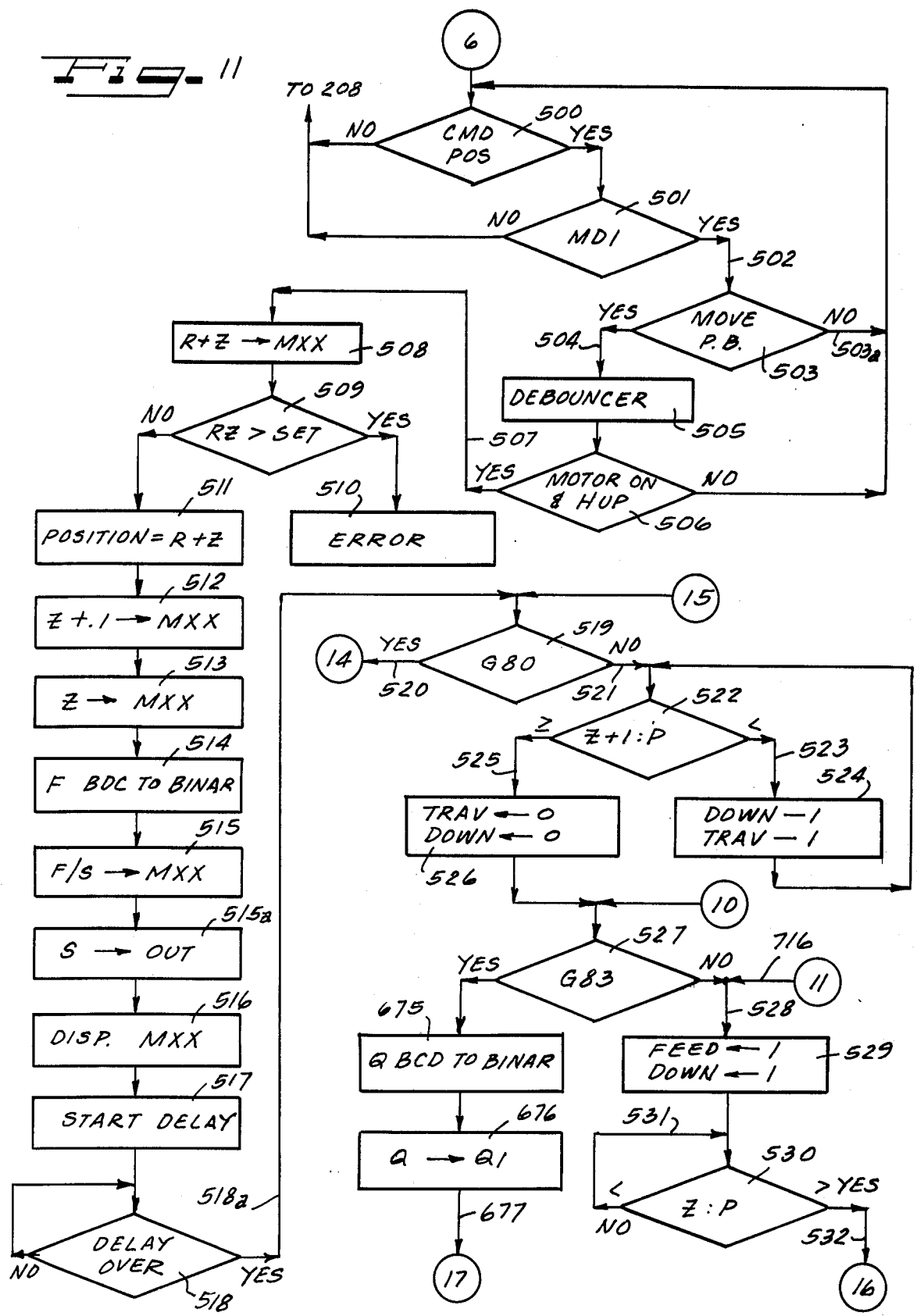
Figure 12:
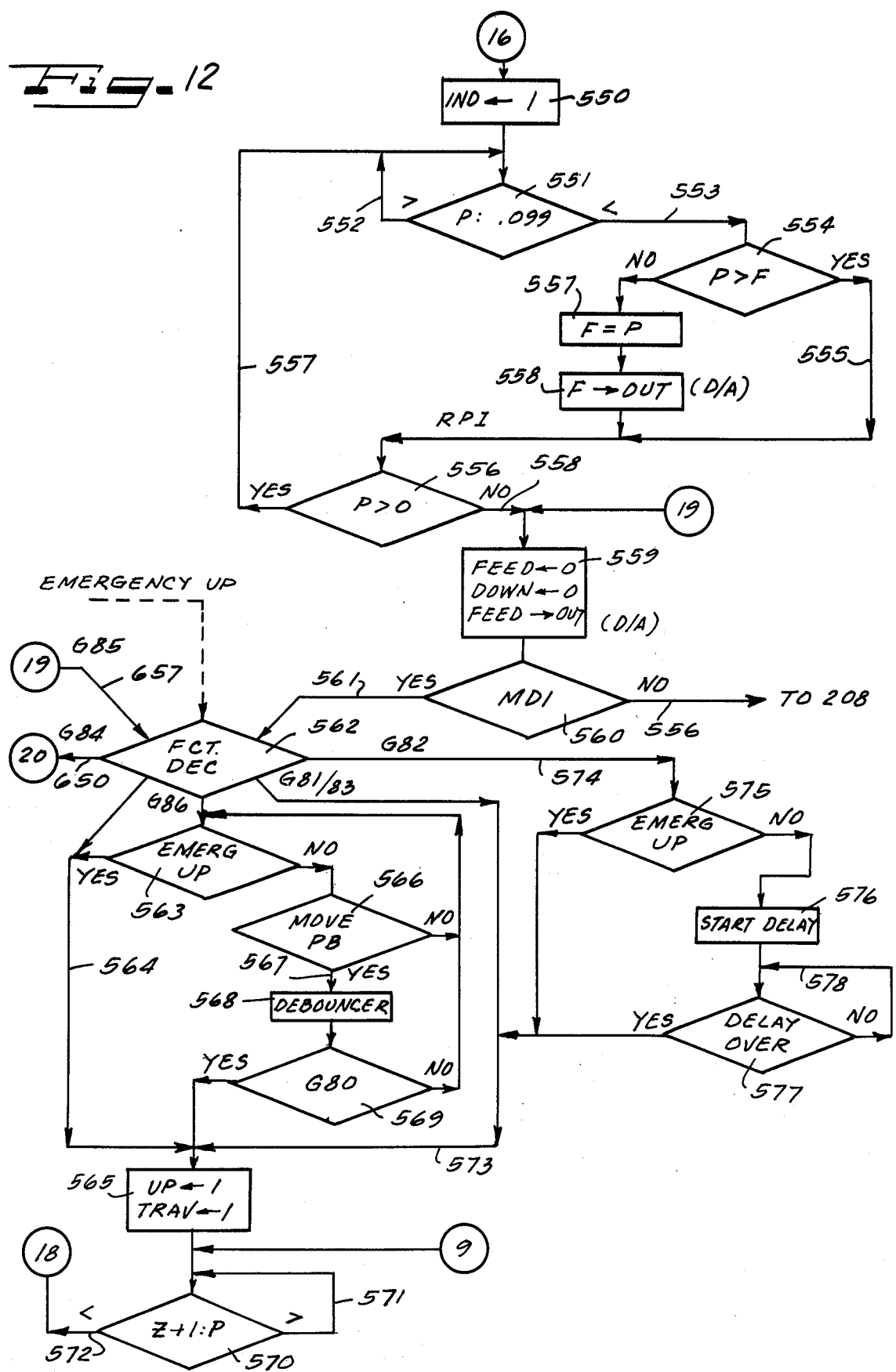
Figure 15:
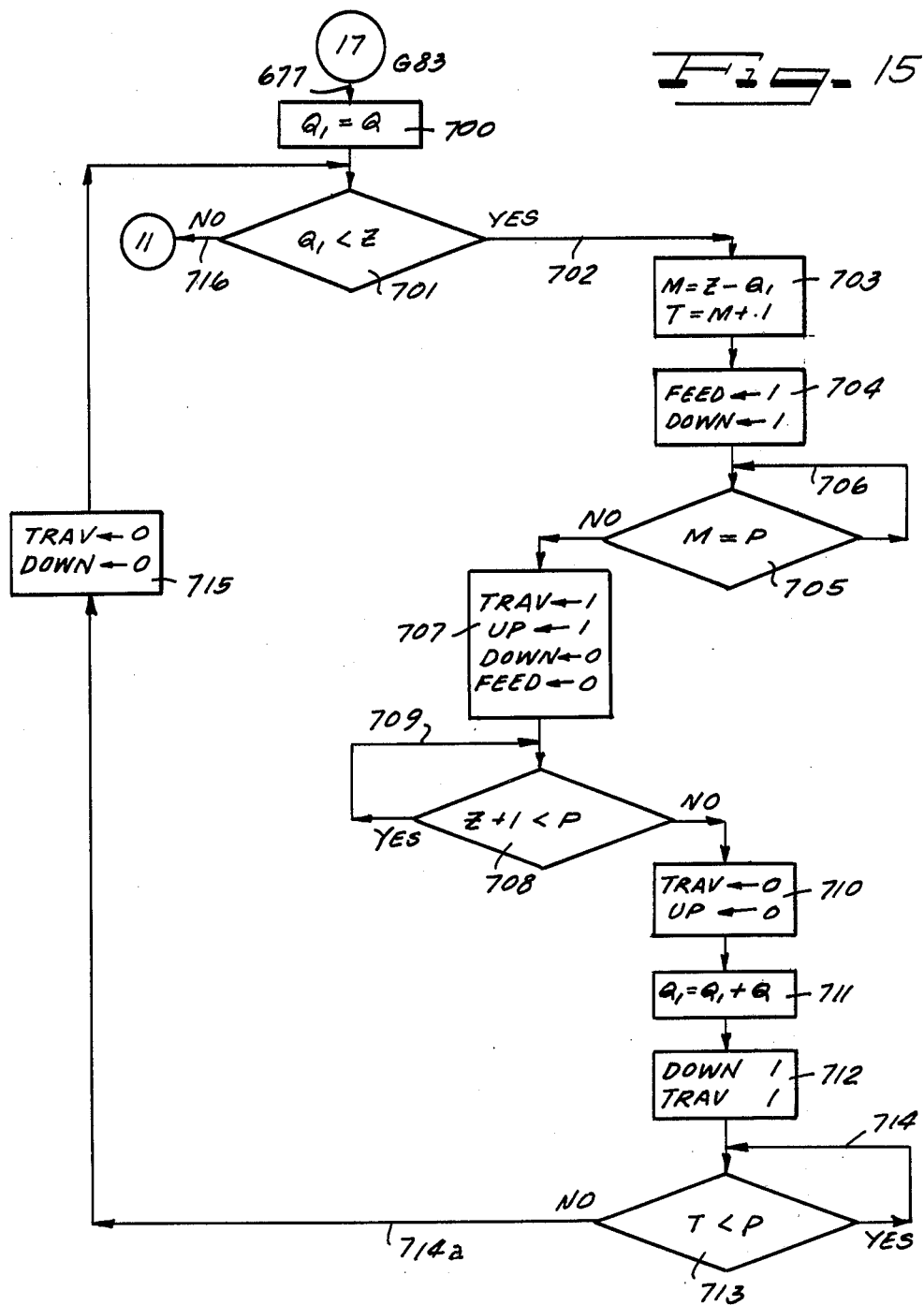

The machine tool associated with the control of the present invention is moved in accordance with the operation defined by the position of the thumb wheels 152 and 153 when the move push button 158 is depressed, with the mode switch 195 in its command/display position. When this occurs, the unit 405 (FIG. 10) selects the branch 426 and control passes to a unit 500 (FIG. 11). The unit 500 inspects the mode switch 155 to determine whether it is in the command/display position and if not, returns control to unit 202 over the line 208.

If the mode switch 195 is still in its command/display position, control is passed to a unit 501 which determines whether an MDI (manual data insert) signal is present. This is a signal generated by the N/C when it is permissible to control the machine tool manually. If the MDI signal is not present, control again returns to the unit 202 over the line 208. If an MDI signal is present, a branch 502 is selected and control is passed to a unit 503 which examines the state of the move push button 158. If it has not been held down a sufficient time, a branch 503a is selected and control is returned to the unit 500. Then the operation repeats as indicated above until the move push button 158 is depressed.

Then branch 504 is selected, and the debouncing routine 505 is entered, after which a unit 506 receives control and examines whether the spindle motor is turned on and the spindle head is in its up position. If not, control is returned to the unit 500, and the operation repeats until the motor and head are found in the proper condition. Then a branch 507 is selected and a unit 508 receives control.

The unit 508 extracts the R and Z data from memory, and adds them together. The memory location is identified by the address register set by the unit 401 (FIG. 10). Then control passes to a unit 509 which compares the result of the R + Z calculation with a quantity which is permanently stored in memory, corresponding to the permissible travel of the particular machine. If R + Z is excessive, an error routine 510 is entered. Otherwise, control passes to a unit 511, which sets the position register equal to R + Z. The position register is subsequently counted down by position-pulses on the line 69 as the head moves down, reaching zero as the full depth of R + Z is reached. Before the head starts to move, however, control is passed to a unit 512, stores the quantity Z + 0.1 (in inches) at a specific location in RAM (FIG. 18). Then unit 513 stores the Z data in a memory location, and passes control to unit 514, which converts the feed number F from BCD format to binary, and then a unit 515 stores the binary representation of the feed speed F number in memory, along with the S number, which is the same in BCD and in binary. Then control passes to unit 515a, which outputs a digital representation of the spindle speed corresponding to the speed code S. Then a unit 516 receives control and displays the F/S data being used and a unit 517 starts a delay timer, to delay subsequent operations until the spindle has had time to come up to speed. Control then passes to unit 518 which continuously determines whether the indicated delay has expired, and, when it does, so passes control over a branch 518a to a unit 519. The unit 519 examines whether a G 80 code signal is present. The G code signals are produced by the N/C unit, and control the specific functions performed by the machine tool. A G 80 code requires cancellation of the cycle in progress. If a G 80 code is present, branch 520 is selected and control passes to a program which raises the head, illustrated in FIG. 13. If a G 80 signal is not present, a branch 521 is selected and control passes to a unit 522.

The unit 522 compares the Z + 0.1 quantity with the current state of the position counter. As long as the current position is far from the R position, the position counter exceeds Z + 0.1, and a branch 523 is selected, passing control to unit 524 which sets the down switch equal to one and the traverse switch equal to one, producing corresponding outputs of the servo drive. The head then travels downwardly at traverse speed until it arrives at a position 1/10 inch above the work, where the position counter = Z + 0.1. Then the branch 525 is selected and control passes to a unit 526 which resets the traverse and down switches. Control then passes to a unit 527 which determines whether a G 83 (deep hole drilling) operation has been called for by the N/C unit. If not, branch 528 is selected and the feed and down switches are both set to one by a unit 529. Control is then passed to a unit 530 which determines when the tool reaches the work, at which the content of the position counter is equal to Z. The unit 530 retains control by means of a branch 531 until the R position is reached. Then a branch 532 is selected.

The branch 532 passes control to a unit 550 (FIG. 12) which sets a penetration indicator equal to one, and then passes control to a unit 551. The penetration indicator is preferably a signal lamp on the control panel of the N/C unit, and illustrates for the operator that the tool has entered the work. The unit 551 then receives control and compares the content of the position counter with 0.099, and retains control by means of branch 552 until the tool position is spaced 0.099 inch from the programmed depth after which control is passed to the unit 554 over branch 553.

The unit 554 compares the content P of the position counter with the feed speed F, passing control to the unit 556, as long as P is greater than F. When P has been reduced sufficiently as to equal F, then unit 557 receives control, and the effective value of F is reset to equal the current content P of the position counter. Then a unit 558 outputs the new F through the digital-to-analog converter 120 (FIG. 4), before passing control to the unit 556.

The unit 556 compares the content of the position counter with zero, and as long as it is greater than zero, returns control to the unit 551 over the branch 557. When P = O, signifying the Z position has been reached, the branch 558 is selected, passing control to a unit 559 which sets the feed and the down switches to zero and outputs the feed speed F, by means of the digital-to-analog converter 120, with an opposite sign, so the tool is conditioned to travel upwardly at the feed speed. Then control passes to the unit 560 which determines whether an MDI signal is present. If not, control passes by branch 561 back to the unit 202 over the line 208, to re-enter the beginning of the program.

If an MDI operation is called for by the presence of an MDI signal, branch 561 is selected and control is passed to a unit 562 which decodes the operation which is required, by inspecting the G code transmitted from the N/C unit.

If a milling cycle (G 86) is selected, control is passed to a unit 563, which inspects the state of the emergency-up switch to determine if it has been operated. If it has, control passes over a branch 564 to a unit 565 which sets the up and traverse switches to move the head-up at maximum speed. If the emergency up switch is not operated, control passes to the unit 566 which inspects the state of the move push button to determine whether it has been operated. If not, control is returned to the unit 563 until the move push button is depressed. Then branch 567 is selected to pass control to the unit 568 for debouncing, and then the unit 569 determines whether a G 80 signal is present, to cancel the operation. If not, control is returned to the unit 563 until either a G 80 or an emergency-up condition is sensed, after which control is passed to the unit 565.

The unit 565 passes control to unit 570 which compares the current state of the position counter with the quantity Z + 0.1, and retains control over a branch 571 until this position is reached. Then branch 572 is selected to pass control to a unit 600 (FIG. 13).

If in response to operation of the unit 562 a G 80 or a G 81 or a G 83 operation is recognized (cancel or drilling or deep hole drilling) a branch 564 or a branch 573 is selected, passing control directly to the unit 565, with the operation the same as described above.

If a G 82 (facing cycle) is recognized by the unit 562, a branch 574 is selected, and control passes to a unit 575 which examines the state of the emergency-up switch to determine if it has been operated. If so, control passes directly to the unit 565. If not, control passes to a unit 576 which starts the delay interval and then passes control to a unit 577 which retains control by way of a branch 578 until the delay interval has expired, after which control is passed to the unit 565.

When the branch 572 passes control to the unit 600 (FIG. 13), the current state of the position counter is equal to Z + 0.1. The unit 600 energizes the spindle to rotate in a clockwise direction, if not already doing so, and passes control to a unit 601 which resets the traverse and feed and up switches, to stop upward movement of the spindle head. The indicator is also reset to show that the tool is free of the work. Then control is passed to unit 602 which examines the state of the emergency-up switch, and if it is found to be energized, branch 603 is selected and control is passed to the unit 604.

The unit 604 also receives control from the unit 519 (FIG. 11) when a G 80 (cancel cycle) signal is recognized. The unit 604 sets the up and traverse switches so the spindle head moves upwardly at maximum speed, and control passes to a unit 605 which monitors the content of the position counter until P equals or exceeds 0.256 inches. Then control is passed to a unit 606 which sets the traverse switch equal to zero and outputs the feed speed F to the digital-to-analog converter, moving the spindle head up at the feed speed.

Then control is passed to a unit 607 which retains control until the spindle head reaches its up condition, after which a unit 609 resets the up switch to zero and sets the feed speed equal to zero, to stop upward movement. Then a unit 610 again examines the emergency-up switch and if it remains energized, stops the program by selecting a branch 611. Otherwise control is returned to unit 202 over the line 208.

If the emergency-up switch is found not to be operated by the unit 602, a branch 612 is selected and control is passed to unit 613 which examines whether an MDI signal is present. If not, control is returned to unit 202 over the line 208. If an MDI signal is present, a branch 614 is selected and control is passed to unit 615 which examines the state of the move push button 158, retaining control by means of branch 616 until the move push button is depressed and its key switch is energized. Then a unit 617 executes a debouncer program, and control is passed over a branch 618, returning control to unit 519 (FIG. 11).

When a G 84 (tapping cycle) is recognized by the unit 562, control is passed over branch 650 to a unit 651 (FIG. 14). The unit 651 reverses the direction of spindle rotation, and passes control to a delay unit 652, which allows time for the spindle to pick up speed. Control then passes to a unit 653 which determines when the delay has expired, retaining control over a branch 654 until the time is up. Then a branch 655 is selected passing control to a unit 656, which outputs the feed speed F and sets the up switch, allowing upward movement of the tapping tool at the feed speed, with the spindle direction reversed. Control is then returned to unit 570 (FIG. 12) over line 656a.

When a G 85 (boring cycle) is selected, control is passed directly from the unit 562 (FIG. 12) to the unit 656 (FIG. 14) over a line 657.

When a G 83 signal is received from the N/C unit, the unit 527 (FIG. 11) passes control to unit 675 which converts the distance setting of the G 83 thumb wheels 160 on the control panel 149 to binary information and then unit 676 stores it at a specific storage location in memory, referred to as the $Q_1$ location. Control then passes over branch 677 to unit 700 (FIG. 15), which sets $Q_1$ equal to Q and passes control to unit 701.

Unit 701 compares the Z data with the contents of $Q_1$, and if $Q_1$ is less than Z, control is returned to the unit 529 over the branch 716 (FIG. 11). Otherwise a branch 702 is selected and control is passed to unit 703 which calculates a parameter M equal to Z minus Q1 and a second parameter T equal to M plus 0.1. Then a unit 704 sets the feed switch equal to one and the down switch equal to one, so that the head is fed downwardly at the feed speed F. Then control is passed to unit 705 which compares the content of the position counter with the parameter M, retaining control over a branch 706 until the position counter becomes equal to the M parameter. Then control passes to a unit 707 which sets the traverse switch and the up switch and resets the down and feed switches, so that the spindle head travels upwardly at traverse speed. A unit 708 compares the content of the position counter with Z + 0.1, retaining control over a branch 709 until equality is sensed. Then control passes to a unit 710 which resets the traverse and the up switches, after which unit 711 increases the quantity stored at $Q_1$ by the value of Q, and the unit 712 then sets the down switch and the traverse switch, to lower the tool rapidly. Control is then passed to unit 713 which compares the content of the position counter with the parameter T, retaining control over the branch 714 until equality is established. Then the branch 714 is selected, and unit 715 resets the traverse and down switches, and returns control to the unit 701, so that the operation can repeat.

The operation continues until the unit 701 senses that the content of $Q_1$ is no longer less than Z, upon which the branch 716 is selected to return control to the unit 529 over the line 716, after which the G 81 procedure is followed.

Figure 16:
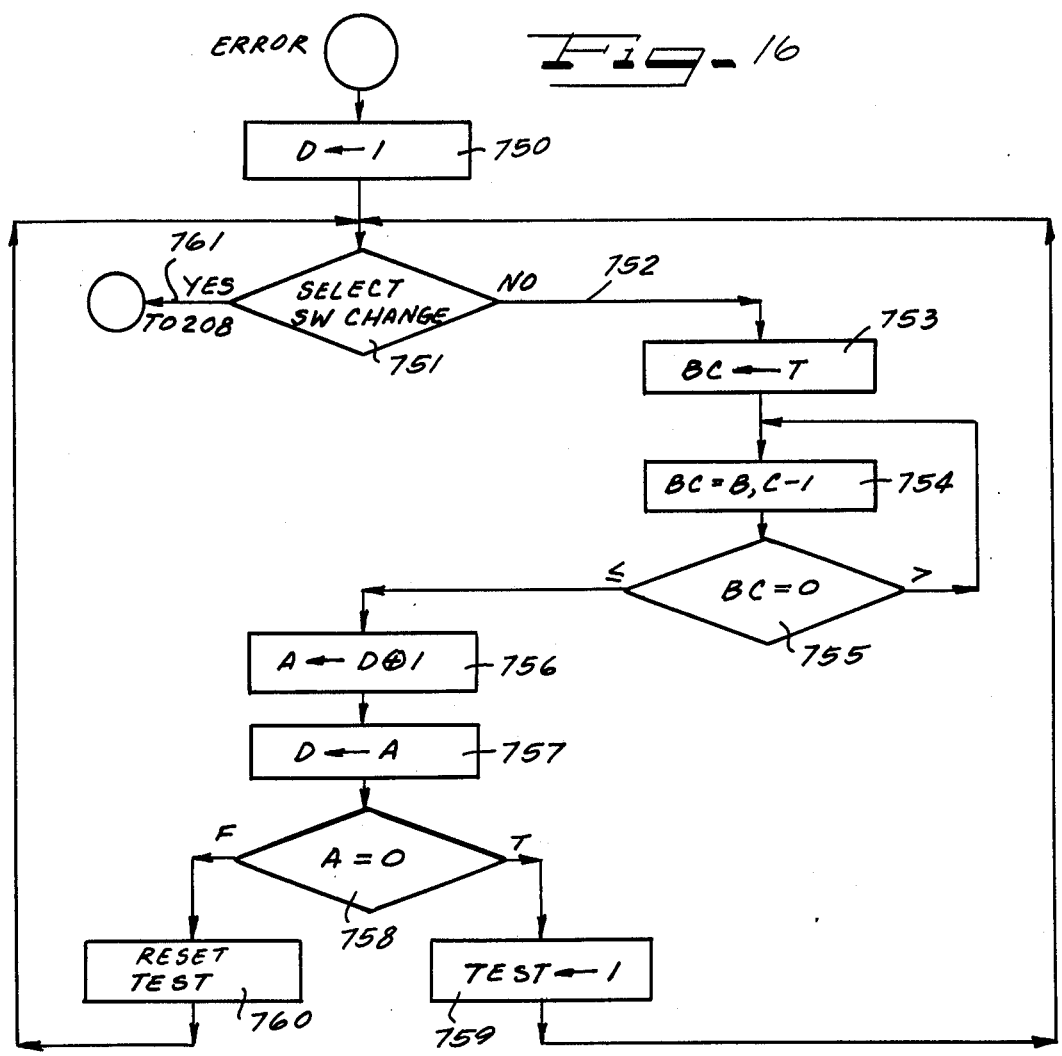

FIG. 16 illustrates an error routine which may be entered by several different units of the program. When it is entered, unit 750 receives control, and sets a D switch equal to 1. Then the unit 751 examines the mode switch 155 to determine whether it has changed position. If not, a branch 752 is entered, and control is passed to the unit 753 which sets the B and C registers equal to the quantity T, after which control is passed to the unit 754 which decrements the C register by one. The B and C registers operate as a single counter of greater capacity than either of the B and C registers alone. The quantity T is proportional to a time interval, as more fully explained hereinafter. Control is then passed to a unit 755 which inspects the state of the B-C counter, returning control to the unit 754 until the state of the B-C counter has been reduced to zero. Then units 756 and 757 complement the D switch, using the A register, and pass control to the unit 758, which inspects the A register to determine whether it is equal to zero.

If the A register is equal to zero, a unit 759 sets the test-display switch equal to one, which supplies a potential to the test input of the display device, causing the display unit 150 to display 88.888, indicative of an error condition. Then control is returned to the unit 751, so the operation described above is repeated. On alternate repetitions, when A is not equal to zero, a unit 760 is selected, which resets the test switch and returns control to the unit 751. As soon as the mode switch 155 is changed in its position, the branch 761 is selected which returns control to the unit 202 over the line 208. The quantity T is selected to cause the test switch to be set and reset at intervals of about ½ second, so the display blinks to signal an error.

Figure 17:
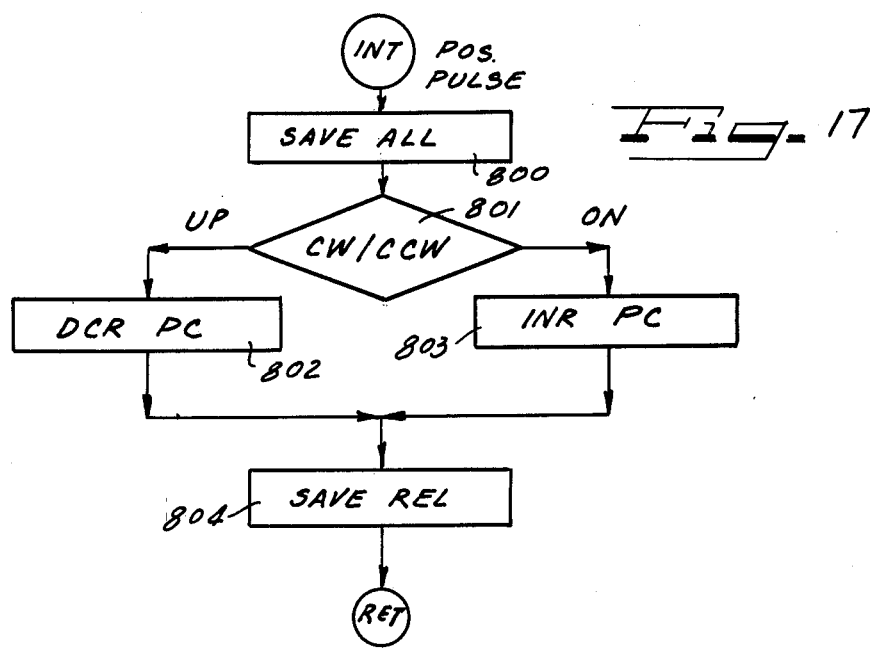

FIG. 17 shows an interrupt scheme for handling the position pulses derived from the position feedback. Each time a position pulse is detected by the apparatus illustrated in FIG. 4, the interrupt program is entered and control is passed to unit 800 which saves the contents of all of the working and operating registers of the microprocessor. Then control is passed to unit 801 which determines whether clockwise or counterclockwise of the position feedback shaft is occurring, and control is passed either to the unit 802 for decrementing the position counter or to the unit 803 for incrementing the position counter so that it can maintain an indication of the correct current position of the spindle head. Then control is passed to a unit 804 by which the register data is restored to the operating and working registers of the microprocessor, after which the normal processing is resumed.

The control panel 149 incorporates three sets of thumb wheels in addition to the location identifying thumb wheels 152 and 153. One thumb wheel pair 162 establishes a time for the delay unit 576 (FIG. 12) for a G 82 operation, which is a facing cycle with a selective dwell. The time set into the unit by the thumb wheels 162 determines the time that the tool is permitted to dwell after having been fed downwardly, before being retracted at rapid traverse.

The thumb wheel pair 169 establishes the A distance for a G 83 operation. This distance is the distance by which the tool can be lowered while drilling, before being retracted free of the work for subsequent drilling. The thumb wheel pair 161 establishes the delay of the delay unit 652 (FIG. 14) for a G 84 operation (tapping cycle) which sets the dwell of the tool at the lowest position, after affecting a tapping operation, before being retracted while rotating in the opposite direction.

It will be appreciated from the foregoing that the present invention provides an efficient means for controlling the operation of the Z axis of the machine tool for a variety of different operations. Fifty different memory locations are each associated with a feed speed number F, a spindle speed code number S, and R and Z distances. When the apparatus of the present invention is employed in conjunction with conventional N/C control equipment for the machine tool, the designation of any of the fifty memory locations permits the apparatus of the present invention to perform a predetermined operation involving the feed speed F, the spindle speed S, and individual dimensions R and Z. This operation is performed with accuracy within 0.005 inches and is repeatable within extremely close tolerances. All position information entered into the system by means of the keyboard 151, or R and Z information can be entered by moving the tool with the regular controls and automatically entering the R and Z dimensions into the machine when desired. In addition, the parameters stored at the several storage locations can be displayed at will, and modified selectively without changing any other data.

In one exemplary embodiment of the present invention the components of FIG. 4 are as follows, all of such components being commercially available from Intel Corp.

Microprocessor 100: CPU Model 8080,
PROM'S 102: Model 2708A,
RAM'S 103: Model 8101
I/O's 104: Model 8212
System Controller 106: Model 8288
Priority Interrupt Control 109: Model 8214
Clock Unit 110: Model 8224.

A typical way of the RAM memory is shown in FIG. 18, showing the buffer and several working registers referred to in connection with FIGS. 7-17, as well as one of the fifty operation storage locations. The other fourty-nine operation storage locations follow directly after the one which is illustrated.

A typicl program, stored in the PROM unit 102, is attached hereto as Appendix A.

Although the apparatus has been described above in its manually operated mode, it will be obvious to those skilled in the art that the apparatus can be operated in an automatic mode under the control of the N/C unit 170, by use of substantially the same programs described above. When the work is properly positioned in its X and Y dimensions, by operation of the N/C unit, control is passed to unit 202 (FIG. 6), and the mode switch is checked to be sure it is in its command/display position. The operations carried out subsequently are the same as described above, except, of course, there is no test for an MDI (manual data input) condition, and there is no need to depress the move push button. When the operations are completed, control is returned to the N/C unit instead of to the unit 202.

The G code signals, in both the manual and automatic modes originate with the N/C unit, and are communicated to the input/output unit 104 over the line 108. Since the present invention contemplates operation with any conventional N/C unit, the details of the N/C unit need not be described.

It will be apparent to those skilled in the art that various modification and additions may be made in the system of the present invention without departing from the essential features of the novelty thereof, which are intended to be defined and secured by the appended claims.

What is claimed is:

1. In a machine tool having motion control means for controlling two axes of movement of said machine tool, a controller separate from said motion control means adapted to control a third axis of operation of a machine tool, said third axis being aligned with the axis of a tool supporting spindle, said controller comprising a microprocessor dedicated to said axis, a memory unit associated with said microprocessor, an input/output control unit associated with said microprocessor and a control panel incorporating a keyboard connected with said input/output control unit, said panel incorporating a display unit for displaying data supplied to or from said input/output control unit, said memory unit having a plurality of storage locations for storing data associated with different operations of said machine tool relative to said third axis, and said keyboard being operative to permit entry of said data into said memory unit, via said input/output control unit.

2. Apparatus according to claim 1, wherein said memory unit has a plurality of individual memory locations for each of said storage locations for storing individual blocks of data representative of distance and speed information for controlling an individual operation of said machine tool.

3. Apparatus according to claim 1, including means associated with said control panel for selectively entering distance and speed data into memory locations associated with a particular storage location.

4. Apparatus according to claim 3, including selector switch means on said control panel, and means associated with said selector switch means for identifying a particular storage location of said memory unit.

5. Apparatus according to claim 4, including operating switch means, and means associated with said operating switch means and with said selector switch means for identifying a particular memory location of said identified storage location.

6. Apparatus according to claim 5, wherein said operating switch means comprises a plurality of switches, one for each memory location of said identified storage location, and means responsive to operation of one of said operating switches for entering data from said keyboard into one of said memory locations which is associated with an operated one of said operating switches.

7. Apparatus according to claim 6, including means for momentarily illuminating an operated one of said opening switches when said data is entered into said memory location.

8. Apparatus according to claim 1, including a plurality of indicating lights on said control panel, and means for selectively illuminating said indicating lights during entry of said data.

9. Apparatus according to claim 1, including a plurality of indicating lights on said control panel, and means for selectively illuminating said indicating lights during display of said data.

10. Apparatus according to claim 1, including an operating switch on said control panel, and means responsive to operation of said operating switch for displaying data stored in one of said storage locations, and means for identifying said one storage location.

11. Apparatus according to claim 10, wherein each of said storage locations comprises a plurality of memory locations, and means responsive to repeated operations of said operating switch for displaying in sequence, data stored in all of said memory locations.

12. Apparatus according to claim 11, including a plurality of indicating lights on said control panel, and means for illuminating said indicating lights individually in response to the identification of the memory location, the data from which is currently displayed.

13. Apparatus according to claim 1, wherein said memory unit includes memory locations at each storage location for storing data representative of two separate distances, data representative of feed speed code, and data representative of a spindle speed code, one of said distances corresponding to a point at which said feed speed code becomes effective to control the rate of feed of said machine tool, and the other distance representing the maximum travel of said spindle during a single machining operation corresponding to said storage location.

14. In a machine tool having motion control means for controlling two axes of movement of said machine tool, a controller separate from said motion control means adapted to control a third axis of said machine tool, said third axis being aligned with the axis of a tool-holding spindle, said controller comprising a transducer associated with said machine tool for producing a train of pulses in response to movement of said spindle along said third axis, a position counter connected to receive said pulses for incrementing or decrementing in accordance with the direction of movement of said spindle, a microprocessor dedicated to said axis for controlling operation of movements of said spindle along said third axis, said microprocessor having a memory unit for storing, at a plurality of storage locations, data representative of a plurality of distances associated with a single machining operation of said machine tool and manually operative means for entering data from said position counter into said memory unit at a selected storage location for each of said distances.

15. Apparatus according to claim 14, including means for inhibiting entry of data relative to a first one of said distances until after data representative of a second one of said distances has been entered into said storage location.

16. In a controller for a machine tool adapted to control movement of a tool-holding spindle about three independent axes, the combination comprising an N/C control unit for controling operation of said machine tool about two axes, and a microprocessor system for controlling operation of said machine tool about a single third axis, said microprocessor system having means for inhibiting operation of said N/C control unit, means for interconnecting said N/C control unit and said microprocessor system, incorporating a memory unit having a plurality of storage locations for storing data representative of a plurality of parameters associated with an individual machining operation, and means operative in response to a signal supplied by said N/C control unit to said microprocessor system for causing said machine tool to execute a machining operation in accordance with said parameters.

17. Apparatus according to claim 16, wherein said microprocessor system incorporates a mode switch and means responsive to operation of said mode switch for inhibiting movement by said N/C control unit of said machine tool, relative to work to be machined.

18. Apparatus according to claim 17, wherein said microprocessor system incorporates a mode switch, and a keyboard, said mode switch having a first position for allowing entry of data from said keyboard into said memory unit.

19. Apparatus according to claim 18, wherein said mode switch has a second position for allowing entry of data derived from the current position of said spindle into said memory unit.

20. Apparatus according to claim 16, wherein said microprocessor system has a display device, and said mode switch has a second position for allowing the selective display of data from said memory unit by said display device.

21. Apparatus according to claim 18, including means responsive to movement of said mode switch away from said first position during an incomplete data entry operation for resetting data entry apparatus responsive to operation of said keyboard.

22. Apparatus according to claim 21, including manually settable means for identifying one of said storage locations, and means operable in response to movement of said manually settable means for resetting apparatus responsive to operation of said keyboard.

23. A method of controlling operation of a machine tool in a single axis parallel to the axis of a tool-holding spindle, said machine tool having independent motion control means for controlling two axes of movement of said machine tool independent from said single axis, comprising the steps of providing a dedicated microprocessor having a memory, entering, at each of a plurality of storage locations of said memory, data representative of a plurality of parameters associated with control of said single axis during single machining operation extracting said data representations from said storage locations individually, during machining operations of said machine tool, providing a position counter, under control of the microprocessor for manifesting a representation of the current position to said spindle along said single axis, comparing said representation with said extracted data, and controlling said machine tool in accordance with the result of said comparison.

24. In a machine tool having a numerical control for two axes normal to the axis of a tool holding spindle, a method of controlling a third axis parallel to the axis of said tool holding spindle in accordance with data which is independent of said numerical control, comprising the steps of providing a microprocessor system for said third axis, providing a control panel for said microprocessor for the manual entry of data into said microprocessor system, and for the selective display of data which has been entered into said microprocessor system, connecting said microprocessor system with the drive mechanism for said third axis, for controlling movement of said spindle along said third axis and for monitoring such movement, and controlling said microprocessor system in conjunction with said numerical control during a machining operation, whereby said numerical control controls relative movement between said spindle and work to be machined in two axes and said microprocessor system controls movement of said third axis.

* * * * *